United States Patent
Lenn et al.

(10) Patent No.: US 8,875,725 B2
(45) Date of Patent: Nov. 4, 2014

(54) FLUID CONNECTOR WITH INTEGRATED EXCESS FLOW VALVE

(71) Applicant: BrassCraft Manufacturing Company, Novi, MI (US)

(72) Inventors: Andrew R. Lenn, Fraser, MI (US); Michael M. Klein, Ann Arbor, MI (US)

(73) Assignee: BrassCraft Manufacturing Company, Novi, MI (US)

( * ) Notice: Subject to any disclaimer, the term of this patent is extended or adjusted under 35 U.S.C. 154(b) by 0 days.

(21) Appl. No.: 13/647,569

(22) Filed: Oct. 9, 2012

(65) Prior Publication Data

US 2014/0096829 A1 Apr. 10, 2014

(51) Int. Cl.
*F17D 3/01* (2006.01)

(52) U.S. Cl.
USPC .......... 137/14; 137/517; 137/460; 251/65

(58) Field of Classification Search
CPC .......... F16K 17/22; F16K 17/32; F16K 17/34
USPC .................. 137/498, 513.5, 513.3, 852, 854, 137/512.15, 517, 460, 461, 14; 251/65
See application file for complete search history.

(56) References Cited

U.S. PATENT DOCUMENTS

| | | | |
|---|---|---|---|
| 1,364,147 A | 1/1921 | Spahr | |
| 1,627,312 A | 5/1927 | Blust | |
| 2,217,380 A | 10/1940 | Pedder et al. | |
| 2,351,035 A | 6/1944 | Grant, Jr. et al. | |
| 2,522,406 A | 9/1950 | Smith | |
| 2,563,200 A | 8/1951 | Venning | |
| 2,571,893 A | 10/1951 | Kendall | |
| 2,699,799 A | 1/1955 | Wager | |
| 2,702,052 A | 2/1955 | Grayson | |
| 2,766,773 A | 10/1956 | Grayson | |
| 2,775,363 A | 12/1956 | Taylor | |
| 2,886,061 A | 5/1959 | Smith et al. | |
| 2,899,981 A | 8/1959 | Binks | |
| 2,936,779 A | 5/1960 | Kindred | |
| 2,949,931 A * | 8/1960 | Ruppright | 137/528 |
| 3,101,190 A | 8/1963 | Lindgren | |
| 3,122,162 A | 2/1964 | Sands | |
| 3,155,292 A | 11/1964 | Webster | |
| 3,159,176 A | 12/1964 | Russell et al. | |
| 3,327,950 A | 6/1967 | Solomon | |
| 3,417,918 A | 12/1968 | Wallace | |
| 3,574,314 A | 4/1971 | Quercia | |
| 3,731,711 A * | 5/1973 | Bauer | 138/178 |
| 3,776,035 A | 12/1973 | Lofink | |
| 3,995,658 A * | 12/1976 | Hager | 137/543 |
| 4,067,539 A | 1/1978 | Perl | |
| 4,177,831 A | 12/1979 | Benjamin | |

(Continued)

*Primary Examiner* — Kevin Lee
*Assistant Examiner* — P. Macade Nichols
(74) *Attorney, Agent, or Firm* — Carlson, Gaskey & Olds, PC

(57) ABSTRACT

A connector for fluids has a pipe through which the fluid flows. The pipe has a diameter, an inlet end, an outlet end, an expanded area relative to the diameter. The connector also has an excess flow cartridge disposed in the pipe, the excess flow cartridge having a housing for receipt within the diameter, the excess flow cartridge minimizing flow in the pipe if flow exceeds a desired limit, and the excess flow cartridge having a radial opening in a side thereof in register with the expanded area such that flow through the opening flows through the cartridge.

23 Claims, 1 Drawing Sheet

(56) References Cited

U.S. PATENT DOCUMENTS

| | | |
|---|---|---|
| 4,240,458 A | 12/1980 | Huff |
| 4,280,523 A | 7/1981 | Norton |
| 4,295,412 A | 10/1981 | Hachiro |
| 4,345,428 A | 8/1982 | Cook |
| 4,605,039 A * | 8/1986 | Johnson et al. ............... 137/460 |
| 4,727,903 A | 3/1988 | Sturgis et al. |
| 4,811,756 A | 3/1989 | Hall |
| 4,958,657 A | 9/1990 | Hagan et al. |
| 5,010,916 A | 4/1991 | Albrecht |
| 5,150,733 A | 9/1992 | Scaramucci |
| 5,203,365 A | 4/1993 | Velie |
| 5,215,114 A | 6/1993 | Breyer |
| 5,280,806 A | 1/1994 | Glazebrook |
| 5,320,135 A * | 6/1994 | Pierrou ...................... 137/513.3 |
| 5,465,751 A | 11/1995 | Newton |
| 5,551,476 A | 9/1996 | McGinnis |
| 5,582,201 A | 12/1996 | Lee et al. |
| 5,613,518 A | 3/1997 | Rakieski |
| 5,704,391 A | 1/1998 | McGowan, Jr. et al. |
| 5,799,684 A * | 9/1998 | Cluett ........................ 137/68.15 |
| 5,833,439 A | 11/1998 | Du |
| 5,921,276 A * | 7/1999 | Lam et al. .................. 137/514.7 |
| 6,123,101 A | 9/2000 | Velie et al. |
| 6,199,583 B1 * | 3/2001 | Iacovella ................... 137/513.3 |
| 6,220,282 B1 | 4/2001 | Powell |
| 6,427,711 B1 | 8/2002 | Kemp |
| 6,889,707 B2 | 5/2005 | Nicolino |
| 6,923,206 B2 * | 8/2005 | Glover et al. ................. 137/517 |
| 6,929,023 B2 | 8/2005 | Whitaker et al. |
| 7,191,795 B2 | 3/2007 | Hettmann et al. |
| 7,331,359 B2 | 2/2008 | Shay |
| 7,533,689 B2 | 5/2009 | Goble |
| 7,562,668 B2 | 7/2009 | Mackay-Smith et al. |
| 7,654,283 B2 | 2/2010 | Seto et al. |
| 7,814,931 B2 | 10/2010 | Newton et al. |
| 7,984,727 B2 | 7/2011 | Southam |
| 8,020,582 B2 | 9/2011 | Lea-Wilson et al. |
| 2008/0185047 A1 | 8/2008 | Eichler |
| 2010/0108160 A1 | 5/2010 | Eichler |

* cited by examiner

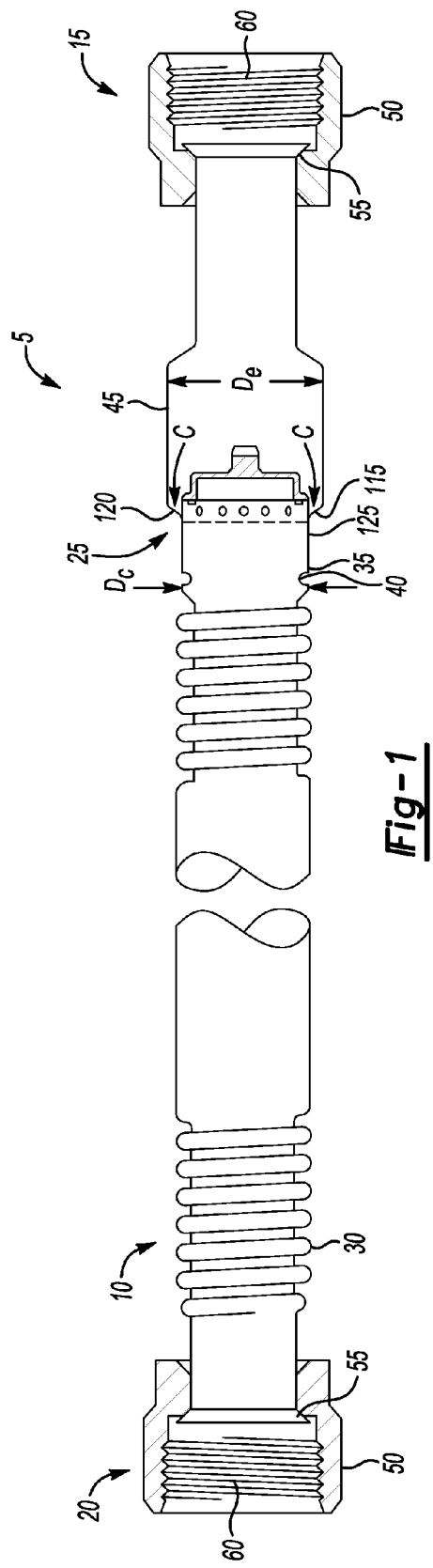
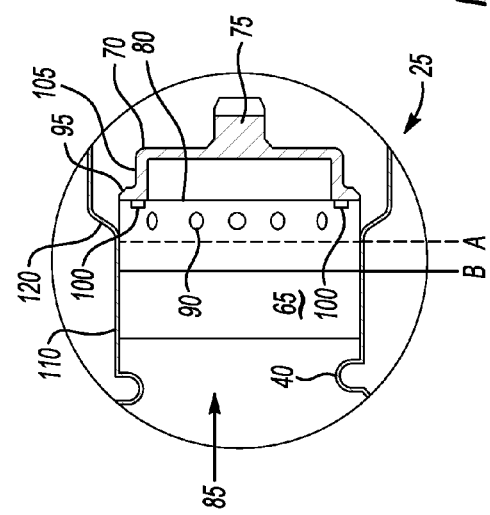

US 8,875,725 B2

FLUID CONNECTOR WITH INTEGRATED EXCESS FLOW VALVE

TECHNICAL FIELD

The present invention generally relates to an excess flow check valve that permits fluid flow through a flow line if the flow is below a predetermined flow rate but minimizes the flow line if the flow rate rises above the predetermined limit to prevent uncontrolled flow or discharge of fluids.

SUMMARY OF THE INVENTION

Excess check flow valves are typically used in a capsule to facilitate its installation in various flow lines, fittings, pipe systems, appliances and the like. The excess flow valve is magnetically or spring-operated in response to a low differential pressure and the packaging being in the form of a self-contained capsule which can be inserted in various flow passageways including a valve body, a connector fitting, a hose fitting, a pipe nipple, a tube, an appliance and other similar installations to provide excess flow protection.

A capsule facilitates assembly of the individual components into a self-contained compact package, provides for easy insertion of the capsule into a fitting or tube, provides means for substantially restricting flow, provides means for allowing small leakage flow for automatic valve resetting, precisely positions and retains the components of the valve for proper operation, provides a unique structure for coupling the two capsule components, permits flow testing as a capsule to verify performance and provides a compact configuration to minimize the size, diameter and length required to accommodate the capsule.

According to an embodiment disclosed herein, a connector for fluids has a pipe through which the fluid flows. The pipe has a diameter, an inlet end, an outlet end, an expanded area relative to the diameter. The connector also has an excess flow cartridge disposed in the pipe, the excess flow cartridge having a housing for receipt within the diameter, the excess flow cartridge minimizing flow in the pipe if flow exceeds a desired limit, and the excess flow cartridge having a radial opening in a side thereof in register with the expanded area such that flow through the opening flows through the cartridge.

According to a further embodiment disclosed herein, a method for controlling fluid flow through a connector for fluids includes the following steps: providing a pipe through which the fluid flows, the pipe having a diameter, an inlet end, an outlet end, an expanded area relative to the diameter; disposing an excess flow cartridge in the pipe, the excess flow cartridge having a housing for receipt within the diameter, the excess flow cartridge minimizing flow in the pipe if flow exceeds a desired limit; and, directing fluid flow directly from the expanded area through a radial opening in a side of the excess flow cartridge in register with the expanded area such that flow through the opening flows through the cartridge.

According to a further embodiment disclosed herein, a method for advertising a fluid connector includes the following steps: providing a pipe through which the fluid flows, the pipe having a diameter, an inlet end, an outlet end, an expanded area relative to the diameter; disposing a given excess flow cartridge in the pipe, the excess flow cartridge having a housing for receipt within the diameter, the excess flow cartridge minimizing flow in the pipe if flow exceeds a desired limit; and advertising uses for the pipe having the diameter and the given excess flow cartridge.

These and other features of the present invention can be best understood from the following specification and drawings, the following of which is a brief description.

BRIEF DESCRIPTION OF THE DRAWINGS

FIG. 1 shows a gas coupling pipe including an excess flow capsule.

FIG. 2 shows an embodiment of an excess flow capsule used in the pipe of FIG. 1.

DETAILED DESCRIPTION OF THE PREFERRED EMBODIMENT

Referring now the Figures, a gas connector 5 includes a fluid pipe 10, an inlet coupling 15, an outlet coupling 20, and an excess flow capsule 25. The pipe may carry different fluids, such as natural gas, or other gases or liquids.

The pipe 10, which may have corrugations 30, has a non-corrugated area 35 that holds the capsule 25, which is bounded by a radially inwardly depending shoulder 40, which may be a groove, and an expanded area 45 for interacting with the excess flow capsule 25 as will be discussed infra.

The expanded area 45 has an increased diameter $D_e$ relative to the diameter $D_c$ of the non-corrugated area 35 to provide more area for fluid flow around and through the capsule 25. That is, $D_e$ is greater than $D_c$.

The inlet coupling 15 and the outlet coupling 20 each have a housing 50 that surrounds flared ends 55, as are known in the art, of the pipe 10. The housings 50 each have an internal thread 60 for mating with external threads (not shown) of a gas supply line (not shown) at the inlet coupling 15 and a with the external threads (not shown) of an appliance (not shown) at the outlet coupling 20.

The capsule 25, which may be of any type though a magnetic capsule is shown herein, has four basic components, a valve body 65, a magnet holder 70, a magnet 75 and a valve plate 80. The valve body 65, which is generally cylindrical, has a centrally disposed flow passageway or orifice 85 and a plurality of circumferential openings 90. The magnet holder attaches to an upstream end 95 of the valve body 65. The magnet holder 70 has a pair of pins 100 for elastically attaching the valve plate 80 thereto. The magnet 75 is spaced upstream from the valve plate 80 by legs 105. The flow passageway 85 has a diameter that approximates, but is smaller than, the diameter $D_c$ of the non-corrugated area 35. If forced by excess pressure, the valve plate 80 moves from first position A downstream until it is in a second engaged position B (see the dotted line in FIG. 2) against shoulder 110.

The expanded area 45 having increased diameter $D_e$ has a tapered portion 115 at a downstream end 120 thereof that is in register with the openings 90. The tapered portion 115 directs fluid from the expanded area 45 through the openings 90 and to the flow passageway 85 through the capsule 25.

In operation, fluid (indicated by arrows C) is directed by the tapered portion 115 around the magnet holder 70 and the valve plate 80 through openings 90 in the valve body 65 and through the flow passageway 85. Because the expanded area 45 increases the area of flow of gas around the capsule 25 there is relatively little pressure drop as the fluid flows by the valve plate 80. The attraction of the magnet 75 thereby attracts the valve plate 80 and the magnet stays in position A. If there is a breakage or the like in the pipe 10, gas flow may not be limited by an appliance (not shown) and there is a risk that gas may flow above a given limit without obstruction. The pressure drop upstream and downstream of the cartridge 25 increases greatly and the valve plate 80 is induced away from the magnet holder 70 and the force of the magnet 75 to seat against the shoulder 110.

If the expanded area 45 is not provided, the valve plate 80 of the capsule 25 would have to have a smaller diameter to allow the proper flow of fluid around it and flow passageway 85 would be restricted because a shoulder extending into the flow passageway 85 would choke the flow. The net effect of no expanded area 45 in register with the openings 90 of the cartridge 25 would be less flow through the pipe 10. By providing the expanded area 45, the narrowest pipes 10 may be used to provide the proper amount of flow to an appliance thereby saving weight and material.

Traditionally, excess flow valves have been formed as an add-on component for gas connectors. Since add-ons may require a threaded connection, the Applicants have discovered that there is the possibility of poor connection by the consumer that may lead to leaks. Furthermore, the excess flow valves and associated connector must be matched to the supply line and appliance for proper operation. To obviate this problem, the gas connector 5 is constructed at a manufacturing facility as follows: before the flared end 55 of the inlet coupling is flared, a capsule 25 is placed into the pipe 10 through the expanded area 45 until the capsule 25 seats against the radially inwardly depending shoulder 40 within the pipe in an interference fit. The pipe 10 has a flat non-corrugated area 125 in contact with the cartridge 25 so that fluid does not escape around the cartridge 25. The housing 50 is slid over the pipe 10 and the flared end 55 is formed. The capsule 25 may be glued or crimped, or the like, in place in the pipe 10, if necessary. The flared end 55 may also form a portion of the expanded area 45. A manufacturer may, away from the manufacturing facility, then market and sell the pipe 10 with the capsule 25 included with tags or other information that tell a consumer in which products or for what required fluid flow the pipe 10 with the integral capsule 25 (i.e. the gas connector 10) are appropriate for use.

The expanded area 45 is placed adjacent said inlet coupling 15 so that any breakage of said pipe 10 can minimize flow therethrough closest to the inlet coupling 15. The expanding area 45 may be made of brass or other fluid/natural gas resistant material. The expanded area may not be corrugated.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A connector for fluids, said connector comprising:
a pipe through which said fluid flows, said pipe having
a diameter,
an inlet end,
an outlet end,
an expanded area relative to said diameter, and
an excess flow cartridge disposed in said pipe, said excess flow cartridge having a housing for receipt within said diameter, said excess flow cartridge defining a first flow condition to maximize flow from said inlet end to said outlet end and a second flow condition to minimize flow in said pipe if flow exceeds a desired limit, said excess flow cartridge having a radial opening in a side thereof in register with said expanded area such that flow through said opening flows through said cartridge when in said first flow condition, and wherein when flow falls below said desired limit said excess flow cartridge returns to said first flow condition.

2. The connector of claim 1 wherein said expanded area has a tapered portion for directing flow from said expanded area to said radial opening.

3. The connector of claim 2 wherein said tapered portion tapers from said expanded area to a flat area in register with said cartridge within said pipe.

4. The connector of claim 1 wherein said pipe is corrugated.

5. The connector of claim 4 wherein said pipe is not corrugated where said excess flow cartridge is disposed within said pipe in an interference fit such that fluid does not escape around said cartridge.

6. The connector of claim 1 wherein said pipe has an internal shoulder for anchoring said excess flow cartridge therein.

7. The connector of claim 1 wherein said expanded area is adjacent to an inlet portion of said pipe.

8. The connector of claim 1 wherein said expanded area is not corrugated.

9. The connector of claim 1 wherein said housing is received within said pipe in an interference fit.

10. The connector of claim 9 wherein said excess flow cartridge includes a magnet holder attached to an upstream end of said housing, a magnet associated with said magnet holder, and a valve plate mounted within said housing for movement relative to said magnet.

11. The connector of claim 10 wherein said magnet holder includes at least one pin that elastically attaches said valve plate to said magnet holder.

12. The connector of claim 11 wherein said magnet is spaced upstream from said valve plate by legs.

13. The connector of claim 1 wherein said excess flow cartridge includes a valve plate that moves in a downstream direction away from said radial opening when in said second flow condition.

14. A method for controlling fluid flow through a connector for fluids, said method comprising:
providing a pipe through which said fluid flows, said pipe having a diameter, an inlet end, an outlet end, an expanded area relative to said diameter;
disposing an excess flow cartridge in said pipe, said excess flow cartridge having a housing for receipt within said diameter, said excess flow cartridge defining a first flow condition to maximize flow from said inlet end to said outlet end and a second flow condition to minimize flow in said pipe if flow exceeds a desired limit; and,
directing fluid flow directly from said expanded area through a radial opening in a side of said excess flow cartridge in register with said expanded area such that flow through said opening flows through said cartridge when in said first flow condition, and wherein when flow falls below said desired limit said excess flow cartridge returns to said first flow condition.

15. The method of claim 14 further comprising deflecting said flow into said radial opening by a tapered portion that is integral with said expanded area.

16. The method of claim 14 wherein said disposing step includes inserting said cartridge in an interference fit with said pipe such that fluid does not escape around said cartridge.

17. The method of claim 14 further comprising placing said expanded area adjacent to an inlet portion of said pipe.

18. The method of claim 14 further comprising the steps of: installing the housing in the pipe in an interference fit.

19. The method of claim 18 further comprising the steps of: providing the excess flow cartridge with a magnet holder attached to an upstream end of the housing, a magnet associated with the magnet holder, and a valve plate mounted within the housing for movement relative to the magnet.

20. The method of claim 14 further comprising the steps of: providing the excess flow cartridge with a valve plate that moves in a downstream direction away from the radial opening when in the second flow condition.

21. A method for advertising a connector for fluids, said method comprising:
providing a pipe through which said fluid flows, said pipe having a diameter, an inlet end, an outlet end, an expanded area relative to said diameter;
disposing a given excess flow cartridge in said pipe at a manufacturing facility, said excess flow cartridge having a housing for receipt within said diameter, said excess flow cartridge defining a first flow condition to maximize flow from said inlet end to said outlet end and a second flow condition to minimize flow in said pipe if flow exceeds a desired limit, and wherein when flow falls below said desired limit said excess flow cartridge returns to said first flow condition; and
advertising away from said facility a use for said pipe having said diameter and said given excess flow cartridge and installing the housing in the pipe in an interference fit.

22. The method of claim 21 further comprising the steps of:
placing a coupling housing over said pipe; and
flaring an end of said pipe for holding said coupling housing on said pipe.

23. The method of claim 21 further comprising the steps of:
providing the excess flow cartridge with a magnet holder attached to an upstream end of the housing, a magnet associated with the magnet holder, and a valve plate mounted within the housing for movement relative to the magnet.

* * * * *